United States Patent [19]

Ida et al.

[11] Patent Number: 4,494,282

[45] Date of Patent: Jan. 22, 1985

[54] JIG TABLE APPARATUS FOR A MACHINE TOOL

[75] Inventors: Jinsei Ida, Sayama; Yosio Hagimoto, Niiza; Masao Takahashi, Kawagoe; Saburo Azuma, Iruma, all of Japan

[73] Assignee: Honda Giken Kogyo Kabushiki Kaisha, Tokyo, Japan

[21] Appl. No.: 344,879

[22] Filed: Feb. 1, 1982

[30] Foreign Application Priority Data

Jan. 30, 1981 [JP] Japan ................................. 56/11659

[51] Int. Cl.$^3$ ............................................ B23Q 41/02
[52] U.S. Cl. ..................................... 29/33 P; 29/563; 198/345; 198/472; 269/14; 269/56
[58] Field of Search ......................... 29/33 P, 563, 568; 198/344, 345, 472; 269/13, 14, 56

[56] References Cited

U.S. PATENT DOCUMENTS

| | | | |
|---|---|---|---|
| 2,808,746 | 10/1957 | Blomquist | 29/33 P X |
| 3,099,873 | 8/1963 | Brainard et al. | 29/568 X |
| 3,825,245 | 7/1974 | Osburn et al. | 29/33 P X |
| 3,858,286 | 1/1975 | Nohejl | 29/568 X |
| 4,133,423 | 1/1979 | Zankl | 29/563 X |
| 4,172,512 | 10/1979 | Clegg et al. | |
| 4,312,110 | 1/1982 | Averyanov et al. | 29/568 |

Primary Examiner—Z. R. Bilinsky
Attorney, Agent, or Firm—Armstrong, Nikaido, Marmelstein & Kubovcik

[57] ABSTRACT

A jig table apparatus for a machine tool is provided. The apparatus comprises first and second jig tables for holding workpieces thereon. A base for positioning adjacent a machine tool and elevating table are provided at a work station for supporting and raising and lowering one of the jig tables at the work station. Also provided is a turntable, a work attaching and detaching station for supporting one of the jig tables and for moving the jig tables to a position for removing a workpiece therefrom and for placing a workpiece thereon, and a transfer device is mounted on the base for moving the first and second jig tables between the working station and the work attaching and detaching stations. The transfer device includes claw members which are coupled to the elevating table and are responsive to the movement thereof, such that the claw members are moved to an engaging position when the elevating table is raised and to a disengaging position when the table is lowered.

7 Claims, 4 Drawing Figures

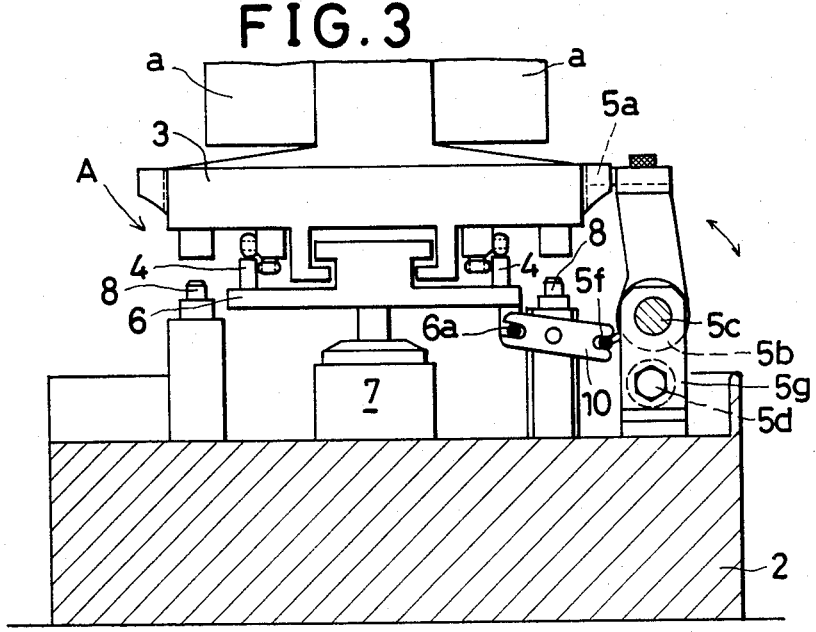
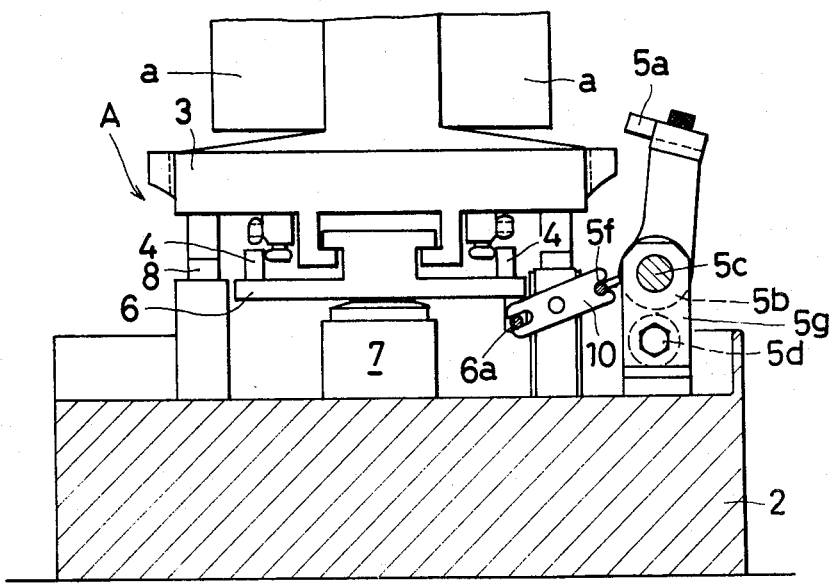

JIG TABLE APPARATUS FOR A MACHINE TOOL

BACKGROUND OF THE INVENTION

1. Field of the Invention

This invention relates to a jig table apparatus for a machine tool.

2. Description of the Prior Art

Prior art jig table apparatuses have been proposed which include a pair of right and left jig tables, each being for holding thereon a work to be worked. The jig tables are mounted on a base member disposed crosswise in front of a machine tool and are movable to the right and the left. The jig tables are so arranged that their alternate transferring to the right and left can be carried out by a transfer member which alternately selects a working station and a work attaching and detaching station, respectively. An elevating table is provided at the working station so that the selected jig table may be supported thereon so as to be movable downwards and a turntable is provided at the attaching and detaching station so that the selected jig table may be supported thereon so as to be turnable forwards and rearwards. Thus, the apparatus is operated such that the two jig tables are transferred to the right and the left such that alternately one of them is positioned in the working station and the other is positioned in the attaching and detaching station. The selected jig table positioned at the working station is then lowered to a ready-to-work position, while the selected jig table positioned at the attaching and detaching station is turned to the reverse side to a ready-toreplace position. In this case, it is required that the jig tables be brought into engagement with a transfer member for being transferred and are disengaged therefrom for lowering and turning. For effecting this changeover between engagement and disengagement, it has been usual hitherto that, in addition to respective first and second driving sources for the transfer member and the elevating table, it is necessary to provide a third driving source. Accordingly, in the above arrangement, the apparatus becomes complicated in construction and troublesome in operation.

SUMMARY OF THE INVENTION

It is an object of the present invention to provide a jig table apparatus which includes engaging claws but does not require an independent driving source therefor.

The present invention is directed to a jig table apparatus having at least one pair of right and left jig tables, each holding thereon a work to be worked. A base member is disposed cross-wise in front of a machine tool, and the jig tables mounted on the base member are arranged such that their alternate transferring to the right and the left is effected by a transfer member. The jig tables are alternately transferred to a working station and a work attaching and detaching station, respectively. An elevating table is provided at the working section for supporting the selected jig table thereon so that it is movable downwards, and a turntable is provided at the attaching and detaching station so that the selected jig table may be supported thereon and is turnable forwards and rearwards, the jig table apparatus is characterized in that an engaging claw member is connected between the transfer member and each jig table. The claw member is movable with upward and downward movements of the elevating table and is retracted to its disengaging position by the downward movement of the elevating table.

BRIEF DESCRIPTION OF THE DRAWINGS

FIGS. 3 and 4 are sectional side views thereof.

DETAILED DESCRIPTION OF THE PREFERRED EMBODIMENT

Figure 1:
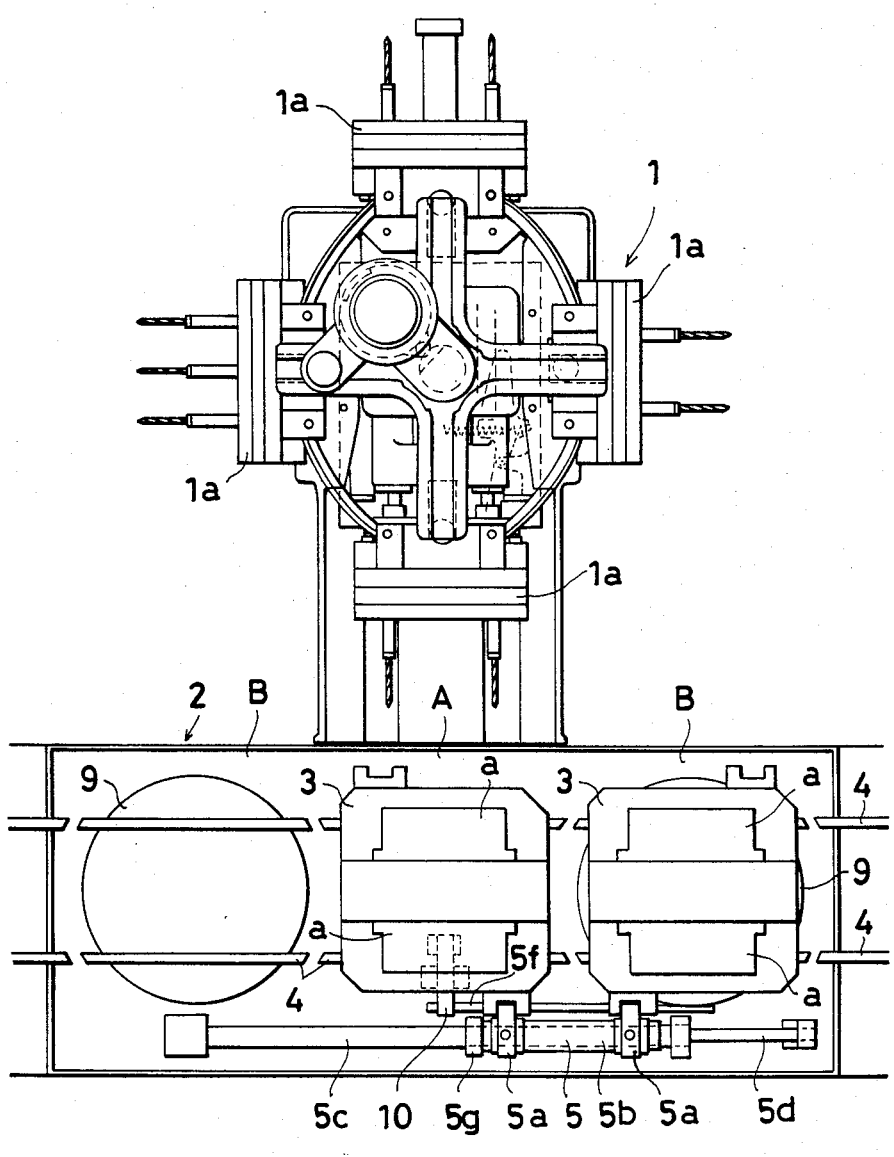
FIG. 1 is a top plan view of the preferred embodiment of the present invention.
Figure 2:
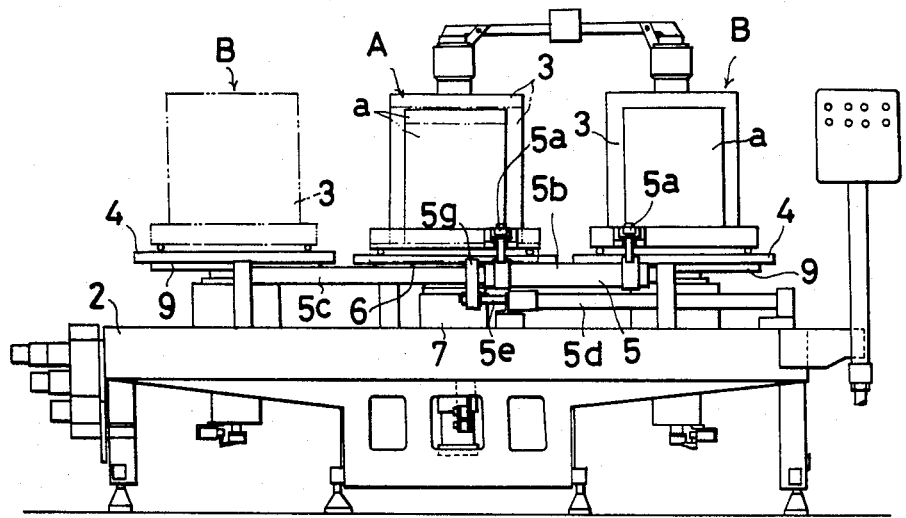
FIG. 2 is a rear side view of a jig table portion thereof.

Referring to the drawings, a ganghead replaceable type machine tool is disposed cross-wise with respect to a base 2. A pair of right and left jig tables 3,3, each for holding a workpiece a to be worked, are positioned side-by-side on the base member 2 so as to be movable to the right and the left along on a rail 4. The jig tables 3,3 are arranged to be brought into engagement with a cross-wise extending transfer member 5 so that, by the reciprocal operation of the transfer member 5, the jig tables 3,3 may be transferred to the right and the left and thereby one of them may be alternately positioned at a middle working station A and the other at one or two work-attaching and detaching stations, B,B on both sides of the station A. When one of the two jig tables 3,3 is selected to be alternated between the working station A and the attaching and detaching station B on one side, the other jig table is, at the same time, alternated between the attaching and detaching station B on the other side and the working station A. Each jig table 3 is of the type that a pair of front and rear workpieces a,a are disposed thereon so as to be on the machine tool 1 side and the reverse side, and the workpiece a on the machine tool 1 side is worked at the working station A and then turned at the attaching and detaching station B so as to be on the reverse side to be readied for replacement thereof.

Thus, in the illustrated example, there are attached onto the jig tables 3,3 four workpieces a, a, a, a to be worked and, in this case, the machine tool 1 may be of the type that the same has four gangheads 1a, 1a, 1a, 1a as shown, for instance, in FIG. 1. This type machine tool is disclosed, for instance, in U.S. Pat. No. 4,216,572.

The transfer member 5 comprises a tubular main body 5b having two engaging claw members 5a, 5a—one for each of the jig tables 3,3. The claw members 5a are mounted on a cross-wise extending guide bar 5c and are connected through an end plate 5g to a piston rod 5e extending from an oil pressure operated cylinder 5d disposed below the guidebar 5c and extending in parallel with the guide bar 5c. The operation of the cylinder 5d slides main body 5b along on the bar 5c in either direction of the right and the left for conveying the jig tables 3,3. The connection between the main body 5b and the end plate 5g is such that the main body 5b is turnable.

There is provided at the working station A an elevating table 6 which is moved upwards and downwards by an oil pressure operated cylinder 7 positioned below the table 6. The selected jig table 3 at that station A is supported on the table 6, and is lowered according to the downward movement of the elevating table 6. When the elevating table 6 is lowered, the jig table 3 is set in position by being mounted on a positioning pin 8. The workpiece a on the jig table 3 is set at its working position facing the front of one of the gangheads of the machine tool 1. Further, a turntable 9 is provided at each of the attaching and detaching stations B,B so that the selected jig table 3 at this station B is supported on the turntable 9 and is turnable forwards and rearwards. Accordingly, the workpiece a on one side, facing the front surface of the machine tool 1 is turned to the reverse side where it is ready to be replaced with a new workpiece.

According to the invention, the engaging claw members 5a, 5a are moved in conjunction with upward and downward movements of the elevating table 6. The members 5a, 5a are tiltable with the turning of the main body 5b connected to the base end portions thereof to move between their inward engaging position and their outward disengaging position. The members 5a, 5a are also linked to a rod 5f provided on the inner side of the main body 5b and extending in parallel therewith. An intermediate swingable lever 10 couples the rod 5f to a rod 6a provided on the lower surface of the elevating table 6 such that, when the elevating table 6 is moved downwards and upwards, the members 5a, 5a are moved therewith to be tilted inwards and outwards, resulting in their movement between the engaging positions and the disengaging positions.

The operation of the apparatus will be explained as follows:

When the elevating table 6 is brought into its elevated position as shown in FIG. 3, the pair of right and left engaging claws 5a, 5a are tilted inwards, that is, toward the left and brought into engagement with the respective jig tables 3, 3. Consequently, if the transfer member 5 is now moved, the two jig tables 3,3 are moved therewith and can be transferred in unison to the right and the left, and the state as shown in FIG. 1, for instance, can be obtained. When selected jig tables 3 on the left side is positioned at the working station A, the jig table 3 is lowered to a position for working on the workpiece a and, simultaneously, the jig table 3 on the right side is positioned in the attaching and detaching station B. The jig table is then turned to the reverse side to be readied for replacement of the workpiece a. If the elevating table 6 is lowered as a result of the foregoing downward movement as shown clearly in FIG. 4, the respective claw members 5a, 5b are moved therewith to be inclined outwards to the right to release the engagement thereof with the respective jig tables 3, 3. In this state, the downward movement and the turning of the respective jig tables 3,3 can be carried out without meeting any obstruction. If the elevating table 6 is, thereafter, moved upwards after the working of the workpiece a as shown in FIG. 3, the respective claw members 5a, 5a are moved therewith to be inclined inwards and returned to their engaging positions and, consequently, the jig tables 3,3 are ready for subsequent transfer movements. If the respective jig tables 3,3 are next moved to the left by the transfer member 5 from the condition shown in FIG. 1, the jig table 3 on the left side is positioned in the attaching and detaching station B, on the other side and, at the same time, the jig table 3 on the right side is positioned in the working position A ready for the next working procedures. The jig table 3 on the right side at the working position A is then lowered and the workpiece a thereon is worked. The above operations are repeated thereafter.

A working operation may be performed with four workpieces a, a, a, a of different kinds on the jig tables 3, 3, which are positioned one after another in front of the machine tool 1, while the four gangheads 1a, 1a, 1a, 1a of different kinds of the machine tool 1 are selected one after another to work on the corresponding workpieces a.

Thus, according to this invention, the engaging claw members for connection between the jig tables and the transfer member are arranged to be moved in conjunction with the upward and downward movements of the elevating table in order to be moved between the engaging positions and the disengaging positions, thereby eliminating the need for a separate driving source as required.

The present invention may be embodied in other specific forms thereof without departing from the spirit or essential characteristics thereof. The presently disclosed embodiments are, therefore, to be considered in all respects as being illustrative and not restrictive. The scope of this invention is intended to be indicated by the appended claims rather than the foregoing description, and all changes which come within the meaning and range of equivalency of the claims are to be embraced therein.

What is claimd is:

1. A jig table apparatus for a machine tool, said apparatus comprising:
    (a) first and second jig tables for holding workpieces thereon;
    (b) base means for positioning adjacent a machine tool;
    (c) elevating table means at a work station for supporting and raising and lowering one of said jig tables at said work station;
    (d) turntable means at a work attaching and detaching station, for supporting one of said jig tables and moving said jig tables to a position for removing a workpiece therefrom and for placing a workpiece thereon; and
    (e) transfer means, mounted on said base means, for moving said first and second jig tables between said working station and said work attaching and detaching stations, said transfer means including claw means, and means coupled to said elevating table means and said claw means, for responding to the movement of said elevating table means thereof, such that said claw means are moved to an engaging position when said elevating table means is raised and that said claw means are moved to a disengaging position when said table means is lowered.

2. A jig table apparatus as set forth in claim 1 wherein said transfer means includes:
    (a) a guide bar means;
    (b) a main body means slidably mounted on said bar means wherein said claw means are mounted on said main body means; and
    (c) piston means, coupled to said main body means for sliding said main body along said guide bar means.

3. A jig table apparatus as set forth in any of claims 1 or 2 including swingable lever means for coupling said claw means to said elevating table means.

4. A jig table apparatus for use with a machine tool, comprising:
    an elongated base member disposed laterally adjacent the machine tool;
    at least one pair of right and left jig tables, each having a workpiece;
    a transfer member disposed on said base member and having means for cooperative engagement with said jig tables for shifting them to the right or left, along the length of said base member, such that said jig tables are shifted to a working station or a work attaching and detaching station on said base member;

an elevating table, provided at said working station for supporting one of said jig tables thereon, and having means for providing upward and downward movement thereof;

a rotatable turntable, provided at said attaching and detaching station for supporting one of said jig tables thereon and having means for the rotation of the jig table thereof; and at least one claw member, pivotally attached to said transfer member and engageable with each of said jig tables, such that said claw member engages or disengages a corresponding jig table responsive to the movement of said elevating table.

5. The jig table apparatus of claim 4, wherein there is one claw member for each jig table, each of said claw members having connecting means for being operatively connected to said elevating table, such that when said elevating table is in its uppermost position, said claw members are engaged with their respective jig tables for shifting thereon, and when said elevating table is in its lowermost position, said claw members are disengaged from said jig tables.

6. The jig table apparatus of claim 5, including a second rotatable turntable provided at a second attaching and detaching station disposed on said base member, such that said elevating station is located between the two said attaching and detaching stations.

7. The jig table apparatus of claim 5, including means for releasing said jig table from said elevating table for shifting said jig table to another station by means of said transfer member, when said elevating table is raised to its uppermost position.

* * * * *